United States Patent [19]

Stewart

[11] 4,380,687
[45] Apr. 19, 1983

[54] POWER SUPPLY CONTROL CIRCUIT FOR SUBSCRIBER CARRIER TELEPHONE SYSTEM

[75] Inventor: James A. Stewart, Redwood City, Calif.

[73] Assignee: GTE Automatic Electric Laboratories, Inc., Northlake, Ill.

[21] Appl. No.: 248,129

[22] Filed: Mar. 27, 1981

[51] Int. Cl.³ ............................................. H04M 19/06
[52] U.S. Cl. ................................. 179/2 BC; 179/251; 320/21
[58] Field of Search ................. 179/2 BC, 2.51, 16 A, 179/16 AA; 320/21, 37, 38, 39, 40

[56] References Cited

U.S. PATENT DOCUMENTS

| | | | |
|---|---|---|---|
| 3,780,228 | 12/1973 | Stewart | 179/2 BC X |
| 3,870,822 | 3/1975 | Matthews | 179/2 BC |
| 3,934,089 | 1/1976 | Stewart | 179/16 AA X |
| 3,968,333 | 7/1976 | Simokat et al. | 179/16 A |
| 4,145,572 | 3/1979 | Stewart | 179/2 BC |

Primary Examiner—G. Z. Rubinson
Assistant Examiner—W. J. Brady
Attorney, Agent, or Firm—Russell A. Cannon

[57] ABSTRACT

A control circuit 16 that is responsive to voltage conditions on a cable pair transmission line for selectively disabling a battey charging circuit 12 operating off of line current comprises a resistor R5 and storage capacitor C2 connected in series across the line; a timing capacitor C1 connected between the cathode of a PUT (programmable unijunction transistor) and one wire 32 of the line; and a zener diode D1 between the PUT anode and one wire 32 for establishing a conduction threshold for the PUT. The resistor R5 and primary conduction path of a first bipolar transistor Q2, having its base connected to the PUT anode, are connected in series between the other wire 33 of the line and the charging circuit so that startup current for the charging circuit may be used for charging C2 when the charging circuit is disabled. Means is also included for driving the PUT gate voltage low and turning on the PUT in response to both high and low voltage conditions on the line. This dumps the C2 charge into C1, the latter discharing slowly for holding the charging circuit diasabled. A second bipolar transistor Q4 senses the charge voltage on C1 for decreasing the PUT gate voltage when the PUT conducts and for increasing the PUT gate voltage immediately prior to the control circuit enabling the charging circuit to draw line current in order to prevent on-off cycling of the latter on a long cable pair.

9 Claims, 1 Drawing Figure

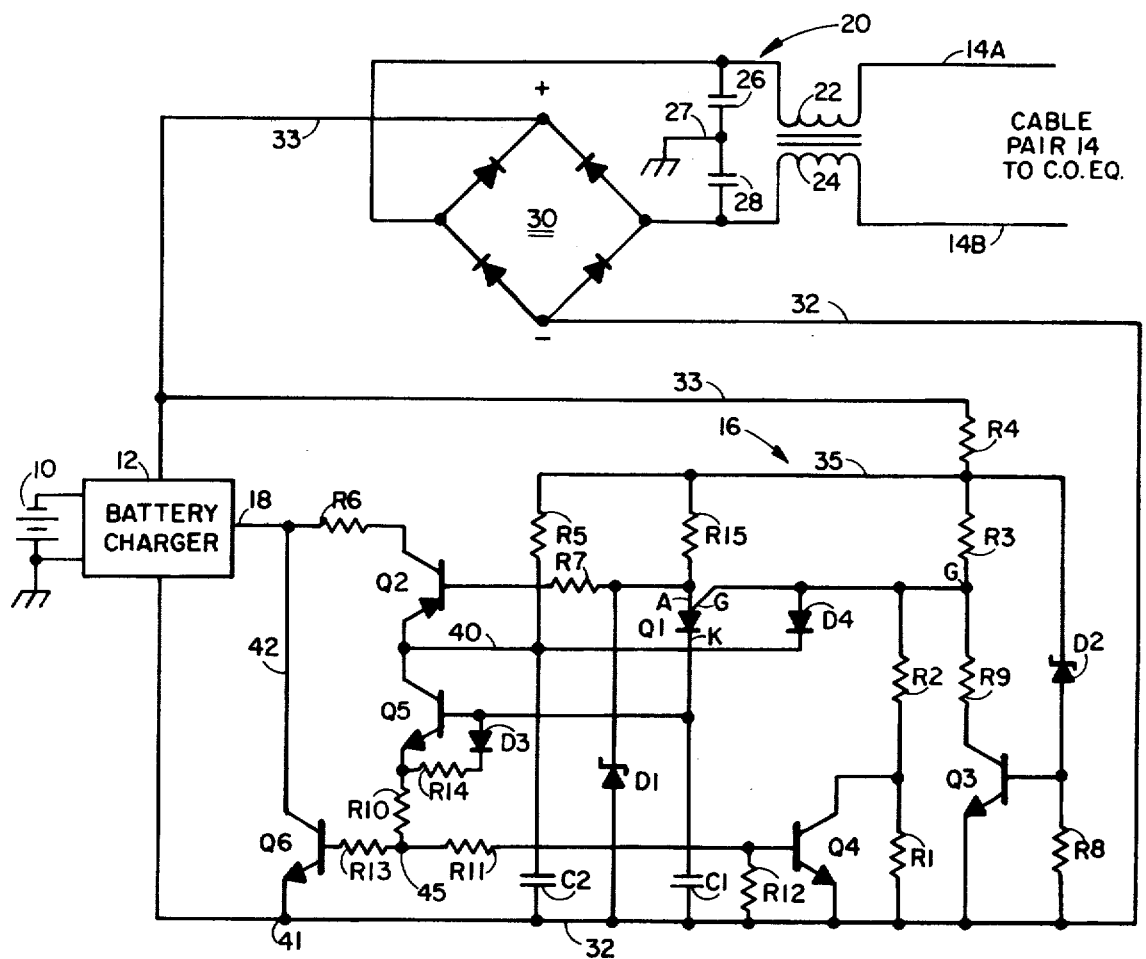

POWER SUPPLY CONTROL CIRCUIT FOR SUBSCRIBER CARRIER TELEPHONE SYSTEM

BACKGROUND OF INVENTION

This invention relates to carrier subscriber telephone systems in which the subscriber terminal includes a local battery that is charged with line current from the central office battery, and more particularly to a control circuit for automatically disabling the local battery charging circuit for a prescribed time interval in response to high voltage and low voltage conditions on the line.

The U.S. Pat. No. 4,145,572, issued Mar. 20, 1979, entitled "Power Supply Control Circuit for Subscriber Carrier Telephone System" by James A. Stewart discloses a control circuit that shuts off a charging circuit associated with a local battery in a carrier subscriber terminal on a cable pair when an associated physical handset is off hook and when central office routiner equipment is connected to the cable pair to check for extraneous voltages and leakages on the subscriber loop. The routiner equipment makes a dc leakage or line insulation test on the cable pair, and thus the control circuit, by charging a capacitor to a prescribed voltage, connecting the capacitor across the cable pair, and measuring the capacitor voltage after a prescribed time interval. This is also a measure of the input impedance of the control circuit and the current drawn by this circuit. The input impedance of and control current drawn by a control circuit according to the patent are 250K ohms and 200 microamperes when 48 volts dc is connected across the line. System specifications have recently been established which enable ALIT (Automatic Line Insulation Test) equipment to indicate changes in line leakage sooner (i.e., the trouble threshold was raised). By way of example, if the threshold is set at 100K ohms and the control circuit represents only 240K ohms, then trouble tickets are printed for lines (carrying subscriber carrier channels) with less than 171K ohms leakage, whereas trouble tickets are printed for physical subscriber circuit lines (without carrier on it) with less than 100K ohms leakage. If the leakage represented by the carrier channel is increased to 800K ohms, however, then trouble tickets for lines with subscriber carrier are printed when the actual combined line leakage is greater than 114K ohms, which is close to that for a line without subscriber carrier. It is desirable, therefore, that the input impedance of the control circuit be as high as possible.

An object of this invention is the provision of improved circuitry for selectively disabling the local battery charging circuit of a carrier subscriber station.

SUMMARY OF INVENTION

In accordance with this invention, a control circuit comprises: PUT means that selectively conducts, in response to both high and low voltage conditions on a cable pair transmission line that are translated to only the PUT means gate, to transfer charge voltage from a storage capacitor C2 to a timing capacitor C1 for disabling a battery charging circuit (which operates off of line current) during timeout of C1; and bipolar transistor means having its base connected to the PUT anode and having its primary conduction path connected between the charge path for the storage capacitor and the charging circuit for diverting startup current for the latter to the storage capacitor when the charging circuit is disabled.

DESCRIPTION OF DRAWING

This invention will be more fully understood from the following detailed description of preferred embodiments thereof, in conjunction with the single FIGURE of drawing which is a schematic circuit diagram of carrier subscriber station equipment.

DESCRIPTION OF PREFERRED EMBODIMENTS

The station equipment in the FIGURE comprises a local battery 10 for powering electrical circuitry such as the transmitter and receiver (not shown) of the carrier subscriber station terminal; a charging circuit 12 for charging the local battery with line current on a transmission line 14 and supplied by a central office power source (not shown); and a control circuit 16 for selectively disabling the charging circuit in response to prescribed voltage conditions on the line 14. An output signal of the control circuit on line 18 controls the operation of the charging circuit. Both the control circuit 16 and the charging circuit 12 are connected through a line tap circuit 20 to the two wire transmission line 14, which may be a cable pair to which carrier subscriber and physical subscriber telephone handsets are connected at various points between this tap circuit 20 and central office equipment (not shown). On a long cable span, the line resistance between the central office and tap circuit may be 1600 ohms, with the central office battery feed providing another 400 ohms resistance in series with the line. It will be apparent therefore that the line voltage between lines 32 and 33 will be high when the charging circuit is disabled and will drop considerably when the charging circuit operates to draw approximately 5 milliamperes of line current over the transmission line 14. The combined operation of the charging circuit 12 and control circuit 16 preferably requires less than 5 milliamperes line current from the wires 14A and 14B of the transmission line for preventing operation of the central office relay for the physical circuit or a loop-extended voltage booster circuit when the physical circuit is on-hook. Also, the line current must be minimized during dial pulsing of the physical subscriber circuit to minimize pulse distortion, and must be kept below 2 mA for at least 40 seconds after the physical subscribers circuit goes "on-hook" to ensure central office switch train release in called party forced release situations.

The line tap 20 comprises a balanced LC lowpass filter including coil windings 22 and 24 and capacitors 26 and 28 for isolating carrier frequency signals (that may be present in the carrier subscriber terminal) from the line 14, and a full wave rectifier 30 which ensures that the charging circuit and control circuit are connected to the line 14 with the correct dc polarity. The rectifier connects the line voltage to the output lines 32 and 33 of the line tap circuit with the polarities indicated. The junction 27 of capacitors 26 and 28 is connected to ac ground.

The circuit 12 for charging the local battery may, by way of example, be a regenerative dc-dc power converter of the type illustrated in the Stewart U.S. Pat. No. 4,145,572, supra. In such a charging circuit, the primary winding of a transformer and the primary conduction path of a switching transistor are electrically connected in series across the wires 14A and 14B of the transmission line, with a secondary winding of the transformer being regeneratively coupled to the base of the switching transistor. The operation of such a charging circuit may be regulated by controlling the base voltage on the switching transistor. In the charging circuit of that patent, the startup current for the switching transistor is dumped by the control transistor into the common line during conduction of the switching transistor. Alternatively, other types of charging circuits may be employed here as long as the amount of line current they require is limited to less than approximately 5 milliamperes.

In accordance with this invention, the control circuit 16 comprises a PUT Q1 having cathode, anode and gate electrodes; a timing capacitor C1 connected between the PUT cathode and line 32; a storage capacitor C2 which is resistively connected across lines 32 and 33, and is connected through the base-emitter junction of a transistor Q2 and current limiting resistor R7 to the PUT anode; a zener diode D1 providing a reference level on the PUT anode; voltage divider resistors R1-R4 electrically connected in series between lines 32 and 33, with a node G thereof connected to the PUT gate for translating low line voltages to the latter; a second zener diode D2 and bipolar transistor Q3 for protecting active elements of the control circuit from high line voltages and translating them to the PUT gate; and a transistor Q4 in the discharge path of the timing capacitor C1 for preventing on-off cycling of the PUT and charging circuit on long lines. The PUT is essentially an active element that switches to a conduction state when its gate is sufficiently negative with respect to its anode, and which continues to conduct until its cathode to anode current falls below a prescribed threshold value. It differs from a conventional unijunction transistor in that its turn-on voltage is programmable by an external voltage. It is basically an anode gated SCR and may comprise a pair of transistors, each having its collector connected to the base of the other transistor. The PUT is turned on for conducting anode to cathode and gate to cathode currents when its gate voltage is approximately 0.8 volt more negative than its anode voltage. It turns off when the gate is positive with respect to its anode by approximately 0.8 volt and its anode to cathode current falls below its holding current, which is the valley current level of its conduction characteristic. In this control circuit 16, the zener diode D1 establishes the conduction threshold voltage for the PUT since it is connected between the PUT anode and line 32. If D1 has a zener voltage of 12 volts, for example, then D1 limits the maximum charge voltage on C2 (ignoring the Q2 base-emitter junction voltage) and the PUT anode voltage to 12 volts. Thus, when C2 is fully charged, the PUT will conduct when its gate voltage falls below approximately 11.2 volts.

During normal operation in which the line voltage is between minimum and maximum threshold values that are established by the control circuit, Q2 draws line current through its emitter resistor R5 and its collector resistor R6 for providing startup current for an active element, which may be a switching transistor, in the charging circuit 12. Reference to the drawing reveals that the storage capacitor C2 is also charged with line current drawn through R5. Since Q2 may be periodically cut off by the operation of the charging circuit, this control circuit automatically diverts the startup current in Q2 to the storage capacitor for speeding up charging of C2 and reducing the current drain required by the control circuit. When the charging voltage on C2 exceeds the sum of the D1 zener voltage and the Q2 base-emitter junction voltage, then the current in R5 is bypassed by the Q2 base-emitter junction, current limiting resistor R7, and D1 to the line 32. In an alternate structure in which the startup current for active elements of the charging circuit is obtained from other than Q2, the Q2 base-emitter junction may be replaced by a short circuit.

The zener diode D1 and the voltage divider resistors R1-R4 establish the lowest line voltage for which the control circuit allows the charging circuit 12 to operate for charging the local battery. More specifically, R1-R4 are selected to translate a minimum line voltage between lines 32 and 33 to a level at node G which will just cause the PUt to conduct to dump charge stored on C2 into timing capacitor C1 and disable the charging circuit, as is described more fully hereinafter. The voltage divider resistors R3 and R4 are specifically selected to reduce a high line voltage such as 100 volts to an acceptable level at line 35 and node G for application to active elements of the control circuit. Additional high voltage protection is provided by a high voltage detection circuit including Q3, zener diode D2, and resistors R8 and R9, which establishes the maximum line voltage for which the control circuit 16 allows the charging circuit 12 to operate. The high voltage zener diode D2 and bias resistor R8 are connected across line 32 and 35, whereas the Q3 primary conduction path and a current limiting resistor R9 are connected in series between line 32 and the node G (i.e., the PUT gate) with the Q3 base-emitter junction connected across R8. The diode D2 may, by way of example, have a 24 volt breakdown voltage. In a control circuit 16 employing such a 24 volt zener diode D2 that was built and satisfactorily operated, the resistors R3, R4, R8 and R9 and diode D2 were selected to make a maximum line voltage of 105 volts on line 14 break down D2. Conduction of D2 passes a current in R8 which turns Q3 on to pull node G and the PUT gate to a potential low enough to trigger the PUT (approximately 2 volts below the D1 zener voltage). This causes the PUT to conduct to dump the C2 charge voltage into C1 and again disable the charging circuit.

The discharge path of timing capacitor C1 includes the base-emitter junction diode of a high gain amplifier transistor Q5, which operates as a capacitive multiplier for increasing the discharge time constant associated with C1, the series connected resistors R10, R11 and R12, and the series combination of a resistor R13 and the base-emitter junction diode of Q6. The primary conduction path of Q6 is connected between the output line 18 of the control circuit and line 32. Conduction of Q6 during discharge of C1 clamps line 18 to the potential on line 32 for disabling the charging circuit and preventing it drawing central office line current on the transmission line 14. A resistor R14 and diode D3 are connected across the Q5 base-emitter junction diode for temperature compensating and stabilizing the circuit gain in Q5. The resistances of R10-R13 and the operation of Q5 are selected for causing Q6 to conduct for a long time interval such as 40 seconds which provides sufficient time for central office called party forced release circuits to function.

On a long line 14, the line voltage may not be high enough to operate the battery charger continuously when the PUT is connected to the lines. This is readily apparent when the operation of the control circuit is considered with Q4 omitted from it. A low voltage at node G will turn the PUT on for disabling the charging circuit, with a resultant increase in the line voltage and the potential on the PUT gate which is normally sufficient to turn off the PUT. On time-out of C1, Q6 cuts off for enabling the charging circuit which now decreases the line voltage as it draws line current. This also decreases the voltage on the PUT gate. On a long line in which the line voltage is already relatively low, this decrease in line voltage that is caused by operation of the charging circuit will again turn on the PUT. This undesirable on-off cycling of the PUT and charging circuit may continue indefinitely. In accordance with this invention, the control transistor Q4 prevents such adverse operation of the control and charging circuits which may cause noise in the carrier channel.

The control transistor Q4 has its base-emitter junction diode connected across R12 and its emitter-collector path connected across R1. This means that conduction of Q4, during conduction of the PUT, will decrease the PUT gate voltage. This effectively raises the turn-off trigger point for the PUT, i.e., it gives the PUT a hysteresis in regard to its turn-off potential. It will be remembered, however, that the line voltage increases when the charging circuit is disabled by conduction of the PUT. If this increase in line voltage is not sufficient to more than offset the decrease in PUT gate voltage caused by conduction of Q4, then the PUT will continue to conduct to hold the charging circuit disabled. Valves of R1-R3 are selected to make the decrease in PUT gate voltage caused by conduction of Q4 ensure that the PUT will continue to conduct whenever the line voltage is not sufficient to continuously turn on the battery charger. The resistances of R11-R13 are also selected for causing Q4 to cut off just before Q6 is cut off during time out of C1 so that the PUT gate voltage increases immediately prior to the charging circuit operating to draw line current, with the resultant decrease in line voltage. This ensures that when the charging circuit turns on, it stays on. This operation of Q4 keeps the charging circuit and PUT from cycling on and off following time out of C1 on a long (e.g., 1600 ohms) transmission line 14.

When the control circuit is initially connected to the tap circuit and a line voltage such as 48 volts, the PUT turns on for enabling C1 and C2 to charge simultaneously. Conduction of D4, which is connected between the PUT gate and the Q2 emitter electrode, maintains the PUT conducting through R13 during this charging of the capacitors. When the charge voltage on C2 exceeds the sum of the D1 zener voltage and the Q2 base-emitter potential, D1 conducts for catching the potential on the PUT anode and bypassing current away from the PUT. When the voltage at node G increases sufficiently, the PUT is cut off and timing capacitor C1 discharges through the base-emitter junctions of Q5, Q4 and Q6 and ones of the resistors R10-R13. Following time out of C1, the PUT and Q3-Q6 are cut off for enabling the charging circuit to operate for charging the local battery, C2 is fully charged, and D1 conducts for bypassing the C2 charging current in R5 to line 32.

A decrease in line voltage, such as may be caused by central office routiner equipment being connected to the line 14, will have no effect on the conduction threshold of the PUT since it is established on the PUT anode by the D1 zener breakdown voltage, e.g., 12 volts. This decrease in line voltage is translated to the PUT gate, however, as an even lower voltage by the voltage divider resistors R1-R4. If the line voltage decreases to a potential such as 20 volts, for example, the PUT gate will be sufficiently negative with respect to its anode to turn the PUT on for dumping the C2 charge voltage into C1. Conduction of the PUT also causes Q5 to conduct to turn on Q6 so as to disable the charging circuit, and to turn on Q4 for decreasing the PUT gate voltage. This change in PUT gate voltage provided by Q4 generally offsets the resultant increase in line voltage caused by shutting off the charging circuit. The charge voltages on C1 and C2 rapidly stabilize at the same values, which reduce the anode to cathode current in the PUT sufficiently to turn it off. If the line voltage remains low, the PUT continues to conduct for maintaining Q6 conducting and the charging circuit disabled. When the line voltage again returns to a nominal value such as 40 volts, however, timing capacitor C1 discharges slowly through R10-R13 for holding Q4-Q6 on and the charging circuit disabled for a long time constant such as 40 seconds, which is sufficient for central office routiner equipment to perform a leakage test on the cable pair 14 and called party forced release circuitry to operate. Immediately prior to time out of C1 (i.e. to cutoff of Q6), Q4 is cut off to raise the PUT gate voltage. This change in PUT gate voltage provided by Q4 generally offsets the decrease in line voltage that will occur when the charging circuit draws line current following cutoff of Q6. This operation of Q4 prevents the PUT and charging circuit cycling on and off following time out of C1.

When the line voltage momentarily increases above an upper threshold limit such as 105 volts during ringing of the physical subscriber's handset, the voltage between lines 32 and 35 exceeds the D2 breakdown potential. Conduction of D2 through R8 then turns on Q3 for decreasing the node G potential sufficiently to turn on the PUT. This protects the active elements of the control circuit from the high line voltage. Conduction of the PUT also dumps the C2 charge voltage into C1 for turning Q6 on and disabling the charging circuit as was described earlier. The PUT continues to conduct until the line voltage decreases to a potential that is sufficient to turn off the zener diode D2 and thus Q3. Non-conduction of D2 and Q3 increases the PUT gate voltage sufficiently to cut off the PUT for allowing C1 to time out in the manner described above.

In an embodiment of this invention that was built and successfully operated, the PUT was a 2N6028 and the diodes D1 and D2 had breakdown voltages of 8.2 and 22 volts, respectively. The resistances in the voltage divider were R1=1.2 megohms, R2=1.2 megohms, R3=681K ohms, and R4=579K ohms. The storage capacitor C2 had a capacitance of 22 microfarads whereas that of the timing capacitor was only 3.3 microfarads. The amplifier transistor Q5 was a PN-2484 with temperature compensation provided by R14 and a silicon diode D3 connected across its base-emitter junction. The timing resistors in the discharge path of C1 were R10=562K ohms, R11=422K ohms, R12=1.2K ohms, and R13=100K ohms. This control circuit drew only 58 microamperes of line current when a line voltage of 48 volts was connected between the lines 32 and 33. This corresponds to a leakage resistance of 827K ohms for the control circuit, which is greater than that provided by the earlier control circuit of the patent and the 800K ohm objective.

Although this invention is described in relation to preferred embodiments thereof, variations and modifications will occur to those skilled in the art without departing from the spirit of this invention. By way of example, other types of electronic switching elements and circuits may be substituted for the PUT Q1. Also, a larger capacitor C1 may be employed in place of the capacitive multiplier Q5, although this would make C1 physically larger and more expensive. Further, Q2 may be replaced with a short circuit between line 40 and R7 in carrier subscriber terminal equipment where the charging circuit receives startup current from other than Q2. Values of the resistors and diode breakdown potentials may also be selected for causing the circuit to trigger for different minimum and maximum line voltages. Additionally, means other than Q6 may be employed for controlling the operation of the charging circuit. By way of example, the line 32 may be broken, between node 41 and the charging circuit, and the primary conduction path of a series switching transistor inserted, with its base resistively connected to the other line 33. The line 42 is also broken and the Q6 collector connected to the base of this new switching transistor. The scope of this invention is therefore defined by the appended claims, rather than the aforementioned detailed description.

What is claimed is:

1. Apparatus responsive to prescribed voltage conditions, such as a high voltage that is greater than a first threshold level and a low voltage that is less than a second threshold level, on the pair of wires of a cable pair for rendering a carrier subscriber local battery charging circuit inoperative for at least a prescribed time interval, operation of the charging circuit connecting it through the cable pair to a central office power source from which it draws current for charging the local battery, said apparatus comprising:

first and second lines adapted for electrical connection to one and other of the cable pair wires;
   a storage capacitor having one and other terminals electrically connected to said first and second lines, respectively, said storage capacitor being charged with line current on the cable pair that is drawn from the central office power source;
   a timing capacitor having a first terminal electrically connected to said first line and having an other terminal;
   programmable unijunction transistor (PUT) means having cathode, gate and anode electrodes, said cathode being electrically connected to the other terminal of said timing capacitor;
   first bipolar transistor means having its primary conduction path electrically connected between the other terminal of said storage capacitor and the charging circuit for selectively providing startup current for an active element of the latter and having a base electrode electrically connected to said PUT means anode, non-conduction of said first transistor means making said startup current available for charging said storage capacitor;
   first means responsive to both high voltage and low voltage conditions on the cable pair that exceed and fall below the first and second threshold levels for producing a voltage change on said PUT means gate that makes it sufficiently negative with respect to the voltage on said PUT means anode to cause said PUT means to conduct and discharge said storage capacitor into said timing capacitor; and
   second means responsive to a charge voltage on said timing capacitor for holding the charging circuit inoperative for at least the prescribed time interval during discharge of said timing capacitor following conduction of said PUT means.

2. Apparatus according to claim 1 including a first resistor in the electrical connection of the other terminal of said storage capacitor to said second line.

3. Apparatus according to claim 2 comprising a first voltage breakdown means electrically connected between said PUT means anode and said first line for establishing a conduction threshold for said PUT means and the maximum charge voltage on said storage capacitor, and wherein said first means produces a voltage change on only the PUT means gate for both high and low line voltages that pass the associated threshold levels so as to make said PUT means conduct.

4. Apparatus according to claim 3 wherein said first means comprises a voltage divider including second, third and fourth resistors electrically connected in series between said first and second lines, the node between said third and fourth resistors being electrically connected to said PUT means gate for translating a low line voltage, that is less than the second threshold level, to an even lower voltage on said PUT means gate that causes said PUT means to conduct.

5. Apparatus responsive to prescribed voltage conditions, such as a high voltage that is greater than a first threshold level and a low voltage that is less than a second threshold level, on the pair of wires of a cable pair for rendering a carrier subscriber local battery charging circuit inoperative for at least a prescribed time interval, operation of the charging circuit connecting it through the cable pair to a central office power source from which it draws current for charging the local battery, said apparatus comprising:

first and second lines adapted for electrical connection to one and other of the cable pair wires;
   a storage capacitor having one and other terminals electrically connected to said first and second lines, respectively, said storage capacitor being charged with line current on the cable pair that is drawn from the central office power source;
   a first resistor in the electrical connection of the other terminal of said storage capacitor to said second line;
   a timing capacitor having a first terminal electrically connected to said first line and having an other terminal;
   programmable unijunction transistor (PUT) means having cathode, gate and anode electrodes, said cathode being electrically connected to the other terminal of said timing capacitor;
   a first voltage breakdown means electrically connected between said PUT means anode and said first line for establishing a conduction threshold for said PUT means and the maximum charge voltage on said storage capacitor;
   first bipolar transistor means having its primary conduction path electrically connected between the other terminal of said storage capacitor and the charging circuit for selectively providing startup current for an active element of the latter and having a base electrode electrically connected to said PUT means anode, non-conduction of said first transistor means making said startup current available for charging said storage capacitor;

first means responsive to both high voltage and low voltage conditions on the cable pair that exceed and fall below the first and second threshold levels for producing a voltage change on said PUT means gate that makes it sufficiently negative with respect to the voltage on said PUT means anode to cause said PUT means to conduct and discharge said storage capacitor into said timing capacitor; said first means producing a voltage change on only the PUT means gate for both high and low line voltages that pass the associated threshold levels so as to make said PUT means conduct;

said first means comprising a voltage divider including second, third and fourth resistors electrically connected in series between said first and second lines, the node between said third and fourth resistors being electrically connected to said PUT means gate for translating a low line voltage, that is less than the second threshold level, to an even lower voltage on said PUT means gate that causes said PUT means to conduct;

said first means further comprising a second voltage breakdown means electrically connected across the lines, and second bipolar transistor means electrically connected between the PUT means gate and said first line;

said second transistor means being responsive to breakdown of said second breakdown means in response to a high voltage on the cable pair that is greater than the first threshold level for reducing the PUT means gate voltage to cause said PUT means to conduct and disable the charging circuit; and second means responsive to a charge voltage on said timing capacitor for holding the charging circuit inoperative for at least the prescribed time interval during discharge of said timing capacitor following conduction of said PUT means.

6. Apparatus responsive to prescribed voltage conditions, such as a high voltage that is greater than a first threshold level and a low voltage that is less than a second threshold level, on the pair of wires of a cable pair for rendering a carrier subscriber local battery charging circuit inoperative for at least a prescribed time interval, operation of the charging circuit connecting it through the cable pair to a central office power source from which it draws current for charging the local battery, said apparatus comprising:

first and second line adapted for electrical connection to one and other of the cable pair wires;

a storage capacitor having one and other terminal electrically connected to said first and second lines, respectively, said storage capacitor being charged with line current on the cable pair that is drawn from the central office power source;

a first resistor in the electrical connection of the other terminal of said storage capacitor to said second line;

a timing capacitor having a first terminal electrically connected to said first line and having an other terminal;

programmable unijunction transistor (PUT) means having cathode, gate and anode electrodes, said cathode being electrically connected to the other terminal of said timing capacitor;

a first voltage breakdown means electrically connected between said PUT means anode and said first line for establishing a conduction threshold for said PUT means and the maximum charge voltage on said storage capacitor;

first bipolar transistor means having its primary conduction path electrically connected between the other terminal of said storage capacitor and the charging circuit for selectively providing startup current for an active element of the latter and having a base electrode electrically connected to said PUT means anode, non-conduction of said first transistor means making said startup current available for charging said storage capacitor;

first means responsive to both high voltage and low voltage conditions on the cable pair that exceed and fall below the first and second threshold levels for producing a voltage change on said PUT means gate that makes it sufficiently negative with respect to the voltage on said PUT means anode to cause said PUT means to conduct and discharge said storage capacitor into said timing capacitor; said first means producing a voltage change on only the PUT means gate for both high and low line voltages that pass the associated threshold levels so as to make said PUT means conduct;

said first means comprising a voltage divider including second, third and fourth resistors electrically connected in series between said first and second lines, the node between said third and fourth resistors being electrically connected to said PUT means gate for translating a low line voltage, that is less than the second threshold level, to an even lower voltage on said PUT means gate that causes said PUT means to conduct;

said first means further comprises a fifth resistor and second voltage breakdown means electrically connected in series between said first and second lines, and the series combination of a sixth resistor and the primary conduction path of a second bipolar transistor means electrically connected between said PUT means gate and said first line;

said second transistor means having its base-emitter junction diode electrically connected across said fifth resistor; a line voltage which is greater than the first threshold level causing said second voltage breakdown means to conduct for turning on said second transistor means and reducing the PUT means gate voltage for causing said PUT means to conduct to disable the charging circuit; and second means responsive to a charge voltage on said timing capacitor for holding the charging circuit inoperative for at least the prescribed time interval during discharge of said timing capacitor following conduction of said PUT means.

7. Apparatus according to claim 6 comprising a first semiconductor diode electrically connected between said PUT means gate and the other terminal of said storage capacitor, and a seventh resistor electrically connected between said PUT means anode and said second line for maintaining said PUT means conducting when said lines are initially connected to a voltage on the cable pair.

8. Apparatus according to claim 6 including a current limiting resistor in the electrical connection of said first transistor means base to said PUT means anode.

9. Apparatus according to claim 6 wherein said second means comprises capacitive multiplier transistor means in the discharge path of said timing capacitor, the series combination of a seventh resistor and second semiconductor diode connected across the base-emitter junction of said multiplier transistor means.

* * * * *